US012629676B2

(12) United States Patent
Katzenelson et al.

(10) Patent No.: US 12,629,676 B2
(45) Date of Patent: May 19, 2026

(54) METHOD AND SYSTEM FOR IMPROVING ACCURACY OF BIOLOGICAL ASSAY

(71) Applicant: MeMed Diagnostics Ltd., Tirat HaCarmel (IL)

(72) Inventors: Omer Nahum Katzenelson, Atlit (IL); Meytal Shraga, Haifa (IL); James Douglas D'arcy Mccully, Footscray (AU); Timothy Francis Lee, Forest Hill (AU); Oren Zarchin, Kfar Saba (IL); Roy Navon, Tel-Aviv (IL); Itay Gissis, Kibbutz HaMaApil (IL)

(73) Assignee: MeMed Diagnostics Ltd., Tirat HaCarmel (IL)

( * ) Notice: Subject to any disclaimer, the term of this patent is extended or adjusted under 35 U.S.C. 154(b) by 903 days.

(21) Appl. No.: 17/832,944

(22) Filed: Jun. 6, 2022

(65) Prior Publication Data

US 2022/0387997 A1 Dec. 8, 2022

Related U.S. Application Data

(60) Provisional application No. 63/197,414, filed on Jun. 6, 2021.

(51) Int. Cl.

| | |
|---|---|
| ***B01L 3/00*** | (2006.01) |
| ***B01L 7/00*** | (2006.01) |

(52) U.S. Cl.

CPC .......... *B01L 3/502715* (2013.01); *B01L 7/52* (2013.01); *B01L 2200/10* (2013.01); *B01L 2200/16* (2013.01); *B01L 2300/0864* (2013.01); *B01L 2300/087* (2013.01); *B01L 2300/1827* (2013.01)

(58) Field of Classification Search

None

See application file for complete search history.

(56) References Cited

U.S. PATENT DOCUMENTS

2011/0190607 A1* 8/2011 Matzinger .......... G01N 21/8483 600/316

2020/0290037 A1 9/2020 Salomon et al.

FOREIGN PATENT DOCUMENTS

JP 2014219258 A * 11/2014 ............. G01N 21/76

* cited by examiner

*Primary Examiner* — Matthew D Krcha

(57) ABSTRACT

A method of conducting a biological assay, comprises obtaining data corelative to a temperature of a reagent, mixing the reagent with a sample to provide a mixture, receiving from the mixture a signal indicative of an amount of an analyte in the sample, and correcting the amount based on the obtained data and on a type of the reagent.

5 Claims, 9 Drawing Sheets

METHOD AND SYSTEM FOR IMPROVING ACCURACY OF BIOLOGICAL ASSAY

RELATED APPLICATIONS

This application claims the benefit of priority of U.S. Provisional Patent Application No. 63/197,414 filed on Jun. 6, 2021, the contents of which are incorporated herein by reference in their entirety.

FIELD AND BACKGROUND OF THE INVENTION

The present invention, in some embodiments thereof, relates to a biological assay and, more particularly, but not exclusively, to a method and system for improving accuracy of a biological assay, particularly a thermally biased biological assay.

Biological assays are procedures for determining the presence, amount, activity, and/or other properties or characteristics of an analyte in a sample. Immunoassays are procedures that identify and/or measures a specific antigen or antibody in a sample by observing the interaction of the specific antigen or antibody with an antibody or antigen contained in a reagent.

Known are systems that perform biological assays automatically. For example, U.S. Published Application No. 20200290037 discloses a system for analyzing a body liquid. The system comprises a cartridge holder, adapted for receiving a multi-well cartridge device, an internal analyzer system for analyzing the body liquid in an analysis chamber, and a robotic arm system carrying a pipette. The robotic arm system visits the wells of the cartridge device to aspirates their contents into the tip of the pipette, and then visits the analysis chamber at which the content of the tip is analyzed.

Many biological assays that are designed to provide quantitative output, particularly immunoassays, require that the used reagents, and sometimes also the sample, be at a recommended range of temperatures, otherwise the quantitative output in inaccurate.

SUMMARY OF THE INVENTION

According to an aspect of some embodiments of the present invention there is provided a method of conducting a biological assay. The method comprises obtaining data corelative to a temperature of a reagent, mixing the reagent with a sample to provide a mixture, receiving from the mixture a signal indicative of an amount of an analyte in the sample, and correcting the amount based on the obtained data and on a type of the reagent.

According to some embodiments of the invention the method comprises measuring a temperature of the reagent, thereby providing the data.

According to some embodiments of the invention the reagent is contained in a cartridge, and the method comprises measuring a temperature of the cartridge, thereby providing the data.

According to some embodiments of the invention the method comprises measuring thermal changes in an environment encompassing the reagent, thereby providing the data.

According to some embodiments of the invention the reagent is contained in a cartridge being in thermal communication with a heating system having a temperature sensor, and wherein the measuring the thermal changes comprises measuring changes in a signal generated by the sensor.

According to some embodiments of the invention the signal is a digital signal $S_m$, and wherein the correcting comprises applying to the digital signal a correction function specific to the reagent, to provide a corrected signal $S_c$.

According to an aspect of some embodiments of the present invention there is provided a system for conducting a biological assay. The system comprises: an analyzer system for receiving a mixture containing a reagent and a sample and generating a signal indicative of an amount of an analyte in the sample; and a data processor having a circuit configured to receive data corelative to a temperature of a reagent, and to correct the amount based on the received data and on a type of the reagent.

According to some embodiments of the invention the reagent is contained in a cartridge, and the system comprises a sensor for measuring thermal changes in an environment encompassing the cartridge, thereby providing the data.

According to some embodiments of the invention the system comprises a heating system having the sensor, wherein the cartridge is in thermal communication with the heating system.

According to some embodiments of the invention the signal is a digital signal $S_m$, and wherein the processor is configured for applying to the digital signal a correction function specific to the reagent, to provide a corrected signal $S_c$.

According to some embodiments of the invention the corrected signal $S_c$ is within 30% of $S_m/f(T,R)$, wherein T is the data, R is a scaling factor specific to the reagent, and f is a predetermined function of T and R.

According to some embodiments of the invention the predetermined function comprises a linear function.

According to some embodiments of the invention the signal comprises an optical signal.

According to some embodiments of the invention the signal comprises a non-optical signal.

According to an aspect of some embodiments of the present invention there is provided control circuitry for a photomultiplier tube. The control circuitry comprises: a capacitor, connectable to an external power source, for maintaining amplification voltage between an anode and a cathode of the photomultiplier tube; a switching circuit having a gate connected to a voltage feeding circuit, and a discharging channel connected to the capacitor, wherein when the external power source is turned off, the feeding circuit momentarily activates the gate such that the capacitor is discharged via the discharging channel.

According to some embodiments of the invention the switching circuit is a MOSFET.

According to some embodiments of the invention the MOSFET is a silicon carbide MOSFET.

According to some embodiments of the invention the voltage feeding circuit comprises an additional capacitor connected such that when the external power source is turned on, the additional capacitor is charged, and when the external power source is turned off the additional capacitor is discharged, causing the momentary activation of the gate.

According to some embodiments of the invention the additional capacitor is discharged via a channel of a transistor, and wherein the external power source is connected to a gate of the transistor.

According to some embodiments of the invention the discharging is characterized by a time constant of less than 100 ms.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
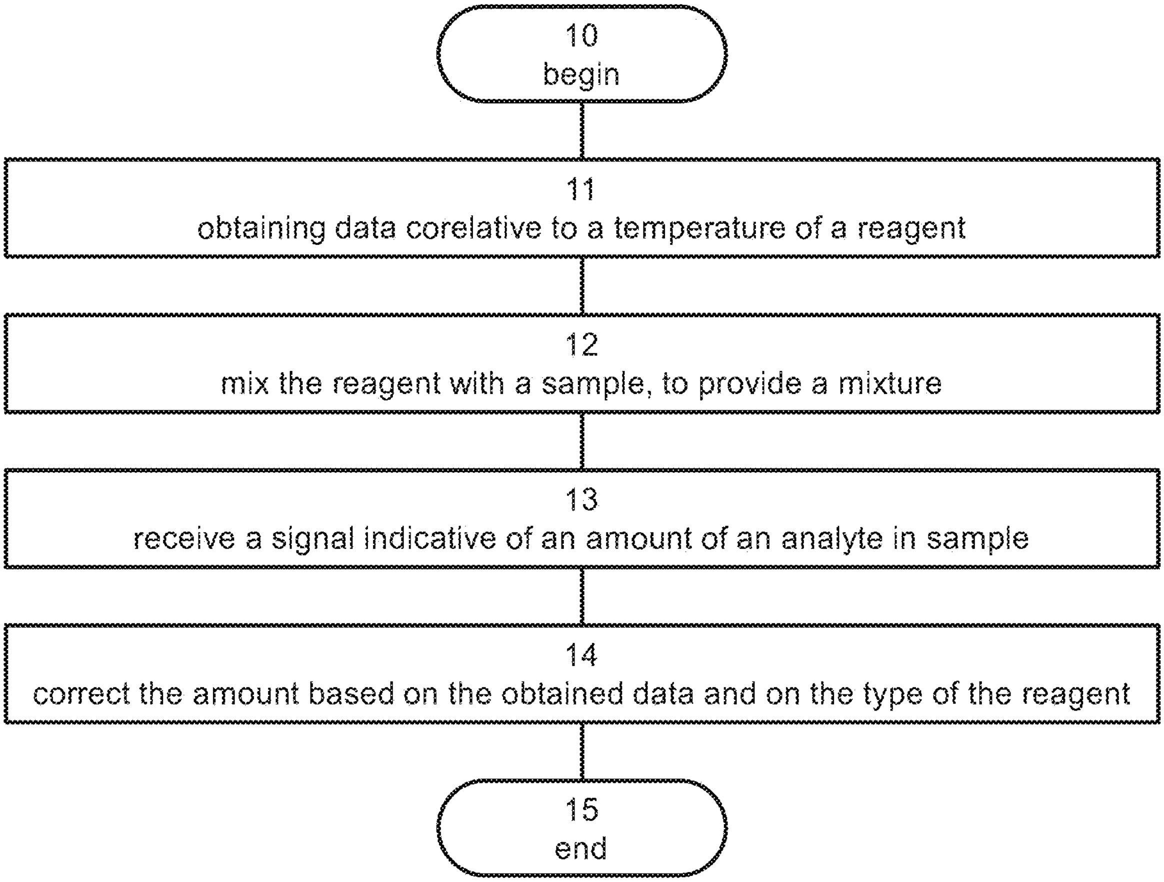
FIG. 1 is a flowchart diagram of a method according to some embodiments of the present invention.

The present invention, in some embodiments thereof, relates to a biological assay and, more particularly, but not exclusively, to a method and system for improving accuracy of a biological assay, particularly a thermally biased biological assay.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

It is appreciated that results of quantitative assays, particularly immunoassays, are sensitive to the temperatures of the reagents that are used, and so typical assay kits are accompanied by a recommended temperature range at which the reagents are to be maintained until the assay is executed. For example, when the reagent includes Antibodies (e.g., TRAIL antibodies) and enzymes (e.g., Alkaline-phosphatase enzyme) in a solution (e.g., TRIS buffer), the recommended temperature range is from about 2° C. to about 8° C. or below (e.g., frozen), and when the reagent are dried (e.g. Lyophilized or the like), the recommended temperature range is Room Temperature (e.g. from about 18° C. to about 25° C.).

The inventors found that while it is possible to equip the analyzing system that performs the assay with a temperature control system so as to maintain the reagents at the recommended temperature range within the system, such a configuration is less than optimal because it requires the reagents to be loaded upfront to the analyzing system, thereby increasing the footprint of the analyzing system, and also makes it useful only for assays that use the loaded reagents.

The inventors also found that is inconvenient to maintain the reagent within a separate a temperature control system until immediately before the assay because it poses a limitation on the user.

In some cases, the reagent is stored at a temperature that is outside the recommended temperature range, and the user is requested to extract the reagent from the storage a certain time period before the assay, so as to bring the reagent to the desired temperature, e.g., by allowing it to reach room temperature, or by heating it artificially. The inventors found that this poses a limitation on the user and results in prolonged assay time.

The inventors found a solution to the above problem, and have devised a technique suitable for improving the accuracy of a biological assay even when the assay is thermally biased.

Referring now to the drawings, FIG. 1 is a flowchart diagram of the method according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed using any system that performs biological assays automatically, such as, but not limited to, the system described in U.S. Published Application No. 20200290037 supra. The method can also be executed by systems that are not fully automatic, for example, systems in which a mixture containing a sample and a reagent is manually introduced to an analysis chamber.

Computation parts of the method can be implemented by computer programs which can commonly be distributed to users on a distribution medium or downloaded from the internet. The computer programs can be run by loading the computer programs into the execution memory of a computer, configuring the computer to act in accordance with the method of this invention. All these operations are well-known to those skilled in the art of computer systems.

Computation parts of the method can be embodied in many forms. For example, they can be embodied in on a tangible medium such as a computer for performing the method steps. It can be embodied on a computer readable medium, comprising computer readable instructions for carrying out the method steps. It can also be embodied in electronic device having digital computer capabilities arranged to run the computer program on the tangible medium or execute the instruction on a computer readable medium. It can be embodied in a computerized controller of a system that performs biological assays automatically, or in a computer readable medium that is accessible by such a computerized controller.

The method begins at 10 and optionally and preferably continues to 11 at which data corelative to a temperature of a reagent is obtained.

Following are examples of reagents for which data corelative to their temperature can be obtained. In some embodiments of the present invention the reagent comprises an antibody suitable for measuring TRAIL. Antibodies suitable for measuring TRAIL include without limitation: Mouse, Monoclonal (55B709-3) IgG (Thermo Fisher Scientific); Mouse, Monoclonal (2E5) IgG1 (Enzo Lifesciences); Mouse, Monoclonal (2E05) IgG1; Mouse, Monoclonal (M912292) IgG1 kappa (My BioSource); Mouse, Monoclonal (IIIF6) IgG2b; Mouse, Monoclonal (2E1-1B9) IgG1 (EpiGentek); Mouse, Monoclonal (RIK-2) IgG1, kappa (BioLegend); Mouse, Monoclonal M181 IgG1 (Immunex Corporation); Mouse, Monoclonal VI10E IgG2b (Novus Biologicals); Mouse, Monoclonal MAB375 IgG1 (R&D Systems); Mouse, Monoclonal MAB687 IgG1 (R&D Systems); Mouse, Monoclonal HS501 IgG1 (Enzo Lifesciences); Mouse, Monoclonal clone 75411.11 Mouse IgG1 (Abcam); Mouse, Monoclonal T8175-50 IgG (X-Zell Biotech Co); Mouse, Monoclonal 2B2.108 IgG1; Mouse, Monoclonal B-T24 IgG1 (Cell Sciences); Mouse, Monoclonal 55B709.3 IgG1 (Thermo Fisher Scientific); Mouse, Monoclonal D3 IgG1 (Thermo Fisher Scientific); Goat, Polyclonal C19 IgG; Rabbit, Polyclonal H257 IgG (Santa Cruz Biotechnology); Mouse, Monoclonal 500-M49 IgG; Mouse, Monoclonal 05-607 IgG; Mouse, Monoclonal B-T24 IgG1 (Thermo Fisher Scientific); Rat, Monoclonal (N2B2), IgG2a, kappa (Thermo Fisher Scientific); Mouse, Monoclonal (1A7-2B7), IgG1 (Genxbio); Mouse, Monoclonal (55B709.3), IgG (Thermo Fisher Scientific); Mouse, Monoclonal B-S23*IgG1 (Cell Sciences), Human TRAIL/TNFSF10 MAb (Clone 75411), Mouse IgG1 (R&D Systems); Human TRAIL/TNFSF10 MAb (Clone 124723), Mouse IgG1 (R&D Systems) and Human TRAIL/TNFSF10 MAb (Clone 75402), Mouse IgG1 (R&D Systems). Antibodies for measuring TRAIL include monoclonal antibodies and polyclonal antibodies for measuring TRAIL. Antibodies for measuring TRAIL include antibodies that were developed to target epitopes from the list comprising of: Mouse myeloma cell line NS0¬derived recombinant human TRAIL (Thr95¬Gly281 Accession #P50591), Mouse myeloma cell line, NS0-derived recombinant human TRAIL (Thr95¬Gly281, with an N¬terminal Met and 6¬His tag Accession #P50591), *E. coli*-derived, (Val114-Gly281, with and without an N-terminal Met Accession #:Q6IBA9), Human plasma derived TRAIL, Human serum derived TRAIL, recombinant human TRAIL where first amino acid is between position 85-151 and the last amino acid is at position 249-281.

In some embodiments of the present invention the reagent comprises an antibody suitable for measuring CRP. Examples of monoclonal antibodies suitable for measuring CRP include without limitation: Mouse, Monoclonal (108-2A2); Mouse, Monoclonal (108-7G41D2); Mouse, Monoclonal (12D-2C-36), IgG1; Mouse, Monoclonal (1G1), IgG1; Mouse, Monoclonal (5A9), IgG2a kappa; Mouse, Monoclonal (63F4), IgG1; Mouse, Monoclonal (67A1), IgG1; Mouse, Monoclonal (8B-5E), IgG1; Mouse, Monoclonal (B893M), IgG2b, lambda; Mouse, Monoclonal (C1), IgG2b; Mouse, Monoclonal (C11F2), IgG; Mouse, Monoclonal (C2), IgG1; Mouse, Monoclonal (C3), IgG1; Mouse, Monoclonal (C4), IgG1; Mouse, Monoclonal (C5), IgG2a; Mouse, Monoclonal (C6), IgG2a; Mouse, Monoclonal (C7), IgG1; Mouse, Monoclonal (CRP103), IgG2b; Mouse, Monoclonal (CRP11), IgG1; Mouse, Monoclonal (CRP135), IgG1; Mouse, Monoclonal (CRP169), IgG2a; Mouse, Monoclonal (CRP30), IgG1; Mouse, Monoclonal (CRP36), IgG2a; Rabbit, Monoclonal (EPR283Y), IgG; Mouse, Monoclonal (KT39), IgG2b; Mouse, Monoclonal (N-a), IgG1; Mouse, Monoclonal (N1G1), IgG1; Monoclonal (P5A9AT); Mouse, Monoclonal (S5G1), IgG1; Mouse, Monoclonal (SB78c), IgG1; Mouse, Monoclonal (SB78d), IgG1 and Rabbit, Monoclonal (Y284), IgG, Human C-Reactive Protein/CRP Biot MAb (Cl 232024), Mouse IgG2B, Human C-Reactive Protein/CRP MAb (Clone 232007), Mouse IgG2B, Human/Mouse/Porcine C-Reactive Protein/CRP MAb (Cl 232026), Mouse IgG2A, Mouse, C-reactive protein (CRP) monoclonal antibody (clone A58014501); Mouse, C-reactive protein (CRP) monoclonal antibody (clone A58015501).

Antibodies for measuring CRP include monoclonal antibodies for measuring CRP and polyclonal antibodies for measuring CRP.

Antibodies for measuring CRP also include antibodies that were developed to target epitopes from the list comprising of: Human plasma derived CRP, Human serum derived CRP, Mouse myeloma cell line NS0¬derived recombinant human C-Reactive Protein/CRP (Phe17-Pro224 Accession #P02741).

In some embodiments of the present invention the reagent comprises an antibody suitable for measuring IP-10. Examples of monoclonal antibodies suitable for measuring IP-10 include without limitation: IP-10/CXCL10 Mouse anti-Human Monoclonal (4D5) Antibody (LifeSpan BioSciences), IP-10/CXCL10 Mouse anti-Human Monoclonal (A00163.01) Antibody (LifeSpan BioSciences), MOUSE ANTI HUMAN IP-10 (AbD Serotec), RABBIT ANTI HUMAN IP-10 (AbD Serotec), IP-10 Human mAb 6D4 (Hycult Biotech), Mouse Anti-Human IP-10 Monoclonal Antibody Clone B-050 (Diaclone), Mouse Anti-Human IP-10 Monoclonal Antibody Clone B-055 (Diaclone), Human CXCL10/IP-10 MAb Clone 33036 (R&D Systems), Human CXCL10/IP-10/CRG-2 MAb Clone 33021 (R&D Systems), Human CXCL10/IP-10/CRG-2 MAb Clone 33033 (R&D Systems), CXCL10/INP10 Antibody 1E9 (Novus Biologicals), CXCL10/INP10 Antibody 2C1 (Novus Biologicals), CXCL10/INP10 Antibody 6D4 (Novus Biologicals), CXCL10 monoclonal antibody M01A clone 2C1 (Abnova Corporation), CXCL10 monoclonal antibody (M05), clone 1E9 (Abnova Corporation), CXCL10 monoclonal antibody, clone 1 (Abnova Corporation), IP10 antibody 6D4 (Abcam), IP10 antibody EPR7849 (Abcam), IP10 antibody EPR7850 (Abcam).

Antibodies for measuring IP-10 include monoclonal antibodies for measuring IP-10 and polyclonal antibodies for measuring IP-10.

Antibodies for measuring IP-10 also include antibodies that were developed to target epitopes from the list comprising of: Recombinant human CXCL10/IP-10, non-glycosylated proteins chain containing 77 amino acids (aa 22-98) and an N-terminal His tag Interferon gamma inducible protein 10 (125 aa long), IP-10 His Tag Human Recombinant IP-10 produced in *E. Coli* containing 77 amino acids fragment (22-98) and having a total molecular mass of 8.5 kDa with an amino-terminal hexahistidine tag, *E. coli*-derived Human IP-10 (Va122-Pro98) with an N-terminal Met, Human plasma derived IP-10, Human serum derived IP-10, recombinant human IP-10 where first amino acid is between position 1-24 and the last amino acid is at position 71-98.

Further exemplary reagents in some embodiments of the present invention include antibodies for measuring at least one of: IL1RA, Mac-2BP, B2M, BCA-1, CHI3L1, Eotaxin, IL1a, MCP, CD62L, VEGFR2, CHP, CMPK2, CORO1C, EIF2AK2, ISG15, RPL22L1, RTN3, CD112, CD134, CD182, CD231, CD235A, CD335, CD337, CD45, CD49D, CD66A/C/D/E, CD73, CD84, EGFR, GPR162, HLA-A/B/C, ITGAM, NRG1, RAP1B, SELI, SPINT2, SSEA1, IgG non-specific bound molecules, Ill, I-TAC, TNFR1, L11, CD8A, IL7, SAA, TREM-1, PCT, IL-8, IL-6, ARG1, BCA-1, BRI3BP, CCL19/MIP3b, MCP-2, ABTB1, ADIPOR1, ARHGDIB, ARPC2, ATP6V0B, C1orf83, CD15, CES1, CORO1A, CRP, CSDA, EIF4B, EPSTI1, GAS7, HERC5, IFI6, KIAA0082, IFIT1, IFIT3, IFITM1, IFITM2, IFITM3, LIPT1, IL7R, ISG20, LOC26010, LY6E, LRDD, LTA4H, MAN1C1, MBOAT2, MX1, NPM1, OAS2, PARP12, PARP9, QARS, RAB13, RAB31, RAC2, RPL34, PDIA6, PTEN, RSAD2, SART3, SDCBP, SMAD9, SOCS3, TRIM 22, UBE2N, XAF1, ZBP1, GFAP, UCH-L1, Troponin, D-dimer, BNP, FGF23, IL-10, IL-6, IL-8, IL1RA1, MCP-3, CSF3, Desmocollin-2, Osteoprotegerin, Stanniocalcin-1 and Cathepsin B.

The temperature of the reagent can be obtained in more than one way. In some embodiments of the present invention the temperature of the reagent is measured directly by a temperature sensor. This can be done, before loading the reagent into the system that performs the biological assays, or, alternatively, one or more temperature sensors can be a component of the system, in which case the temperature of the reagent is measured after the reagent is loaded to the system.

In some embodiments of the invention, the reagent is contained in a cartridge, and the temperature of cartridge is measured. Also contemplated, are embodiments in which the method measures thermal changes in an environment encompassing the reagent. These embodiments are useful when the system that performs the biological assays includes one or more temperature sensors, and the reagent is contained in a cartridge. In this case, the method can obtain signals from the sensor(s) before and after loading the cartridge to the system, thereby obtaining data that is correlative to the temperature of the reagent. For example, when the cartridge including the reagent is stored at a temperature that is below the ambient temperature, once the cartridge is loaded to the system it reduces the temperature of the environment encompassing the cartridge in a manner that is correlative to the temperature of the reagent in the cartridge.

In some embodiments, two or more of the above ways to obtain the data are employed. For example, the data can be obtained both by directly measuring the temperature of the cartridge and by indirectly measuring temperature changes in the environment.

The method continues to 12 at which the reagent is mixed with a sample to provide a mixture. The mixing can be done in any fluidic device, such as, but not limited to, within a mixing well or within a pipette tip. The mixing can be done automatically, for example, by a robotic arm carrying a pipette that releases the reagent and/or the sample into the same well, or aspirates the reagent and the sample into the same pipette tip.

The method continues to 13 at which a signal indicative of an amount of an analyte in the sample is received from the mixture. The signal can be any type of signal that is capable of identifying the analyte in the sample. Preferably, the signal is an optical signal (e.g., a chemiluminescent signal or a fluorescent signal) emitted by a substrate that directly or indirectly interacts with the analyte in the sample. Alternatively the signal can be an optical signal transmitted through the mixture, quantifying the absorbance properties of the analyte. The optical signal is indicative of the amount of the analyte in the sample, and it can be detected by an optical detector providing an electrical signal that is also indicative of this amount. Alternatively, the signal can be a non-optical signal, such as, but not limited to, an electrochemical signal, or the like.

The method proceeds to 14 at which the measured amount of analyte in the sample is corrected based on the obtained data and on the type of reagent. The correction can be applied directly or indirectly to the amount of analyte in the sample. When the correction is applied directly, the amount of analyte in the sample is extracted from the signal measured at 13, and the correction is applied to the extracted amount. When the correction can be applied indirectly, the correction is applied to a digital form of the signal measured at 13, and the amount of the analyte in the sample is extracted from the corrected signal.

The correction 14 is preferably applied by accessing a database including a correction function for each of a plurality of reagents or reagent combinations. Alternatively, the method can employ a predetermined correction function, and the database can include a specific set of parameters for the predetermined correction function for each of the plurality of reagents or reagent combinations. The database can be prepared in advance and be stored in a computer readable medium accessible to the method. Utilizing the database, the method can apply the correction function to a digital signal $S_m$ to provide a corrected signal $S_c$. Preferably, the correction is applied irrespectively of the type of signal obtained at 13 or the procedure employed to obtain the signal.

In some embodiments of the present invention the corrected signal $S_c$ is within 30% or within 20% or within 10% of the expression $S_m/f(T,R)$, wherein T is the data obtained at 11, R is a scaling factor parameter that is extracted from the database and that is specific to the reagent, and f is a predetermined function of T and R. Preferably, but not necessarily, f comprises a linear function of T and R, but may optionally also includes one or more terms that are non-linear in R and/or T.

For example, in experiments performed by the Inventors, it was found that adequate results are obtained when f(T,R) has the form:

$$f(T,R)=1+R(\Delta T-\Delta T_{ref})$$

where ΔT is the temperature change that is induced by the reagent on the environment, and $\Delta T_{ref}$ is a predetermined reference temperature difference. ΔT can be expressed relative to a temperature measured immediately before using the reagent. For example, when the system that performs the biological assays includes a temperature sensor, ΔT can be the difference between the temperatures measured by the sensor before and after the reagent is loaded to the system. The reference temperature difference $\Delta T_{ref}$ can be global, or assay-specific or, more preferably, specific to the recommended temperature range at which the reagents are to be maintained until the assay is executed. For example, $\Delta T_{ref}$ can be measured in advance and be defined as the value of ΔT when the temperature of the reagent is within the recommended temperature range of the respective reagent (e.g., the central temperature within the recommended temperature range.

In experiments performed by the Inventors using TRAIL, IP10, and CRP antibodies, $\Delta T_{ref}$ was set to the value of 1.3° C. which was found to be the value of ΔT when the temperature of a cartridge containing the reagents was about 8° C. It is to be understood, however, that other value for $\Delta T_{ref}$, e.g., from about 1° C. to about 1.6° C., or values that exceed to about 1.6° C. or are below 1.0° C., are also contemplated according to some embodiments of the present invention.

Representative examples of suitable values of the scaling factor parameter R for various reagent combinations are provided in the Examples section that follows. It is appreciated that the correction function can also use additional observables, other than the temperature change ΔT. For example, the correlation function can consider the nominal temperature of the cartridge that contains the reagent, the nominal environmental temperature, the temperature of other components of the system, the temperature of the sample, and the like.

When there is more than one analyte to be detected, each using a different reagent, the method optionally and preferably calculates the correction separately to the reagents using different correlation functions, or different parameters (e.g., different values for the scaling factor parameter R).

The method ends at 15.

In some embodiments of the present invention the analyte in the sample is TRAIL, in some embodiments of the present invention the analyte in the sample is CRP, and some embodiments of the present invention the analyte in the sample is IP-10. Reagents for immunoassays capable for measuring amounts of these analytes are found, for example, in U.S. Published Application No. 20200290037, supra.

Figure 2:
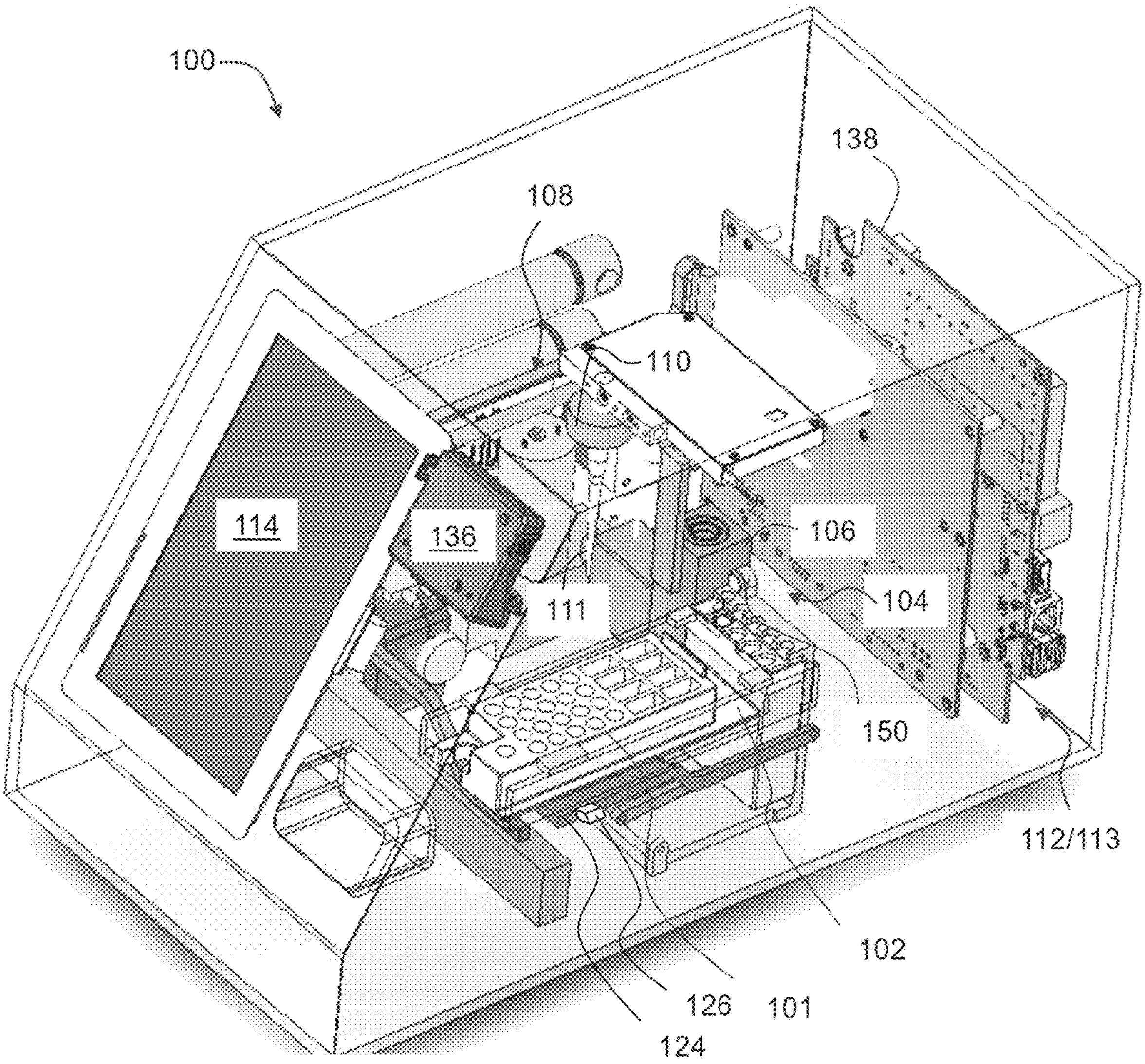
FIG. 2 is a schematic illustration of a system for analyzing a liquid (e.g., body liquid), according to some embodiments of the present invention.

FIG. 2 is a schematic illustration of a system 100 for analyzing a liquid (e.g., body liquid), according to some embodiments of the present invention. System 100 can be used for executing the method described above with reference to FIG. 1. In some embodiments of the present invention system 100 is a point-of-care (POC) system.

System 100 comprises a cartridge holder 102, adapted for receiving a cartridge device 101 having a plurality of wells, and an internal analyzer system 104, having an analysis chamber 106 and being configured for analyzing the liquid (e.g., body liquid) when enclosed in analysis chamber 106. System 100 can also comprise a robotic arm system 108 carrying a pipette 110 having a disposable tip 111. Pipette 110 can be a controllable air displacement pipette, as known in the art, and tip 111 can be detachable from pipette 110. Preferably, device 101 can hold one or more disposable tips to be used by system 100. System 100 further comprises a controller 112 configured for controlling robotic arm system 108 to establish a relative motion between device 10 and pipette 110 such that tip 111 of pipette 110 sequentially visits at least cartridge device 101 and analysis chamber 106. Controller 112 optionally and preferably ensures that pipette 110 connects to, and picks up, one of the tips 111 from device 110 before visiting the wells and, and further ensures that pipette 110 releases tip 111 into back into device 101, after visiting analysis chamber 106. Controller 112 optionally also configured to control pipette 110 (e.g., by controlling piston motions within pipette 110) to aspirate liquids into tip 111 and/or dispense liquid out of tip 111. Controller 112 optionally and preferably receives signals from a data processor 113. Preferably, but not necessarily, both controller 112 and data processor 113 are mounted on the same control board 138.

Preferably, analysis chamber 106 is a dark chamber and internal analyzer system 104 is an optical analyzer configured for detecting chemiluminescent signals from the pipette tip 111 when the pipette tip is in dark chamber 106. Internal analyzer system 104 can include an optical detector (not shown) such as, but not limited to, a photomultiplier tube (PMT) mounted on a side wall of chamber 106. The optical detector provides a signal that is indicative of the amount of the analyte in the sample as further detailed hereinabove.

System 100 optionally and preferably comprises a display 114 for displaying information thereon. For example, display 114 can receive display instructions from internal analyzer system 104 to display the results of the analysis performed by internal analyzer system 104. In some embodiments of the present invention, system 100 comprises a reader device 136 for reading information stored on device 101.

In some embodiments of the present invention system 100 employs an analysis protocol based on the information read by reader device 136, for example, by selecting a protocol from a list of protocols recorded on a computer readable medium accessible by data processor 113. Alternatively, the list of protocols can be recorded on an external computer readable medium, in which case the information read by reader device 136 is optionally and preferably transferred over a network to an external computer (not shown), that selects the protocol from the list of protocols and transfers it to system 100. The protocol to be run by system 100 may comprise instructions to controller 112 to perform the protocol, including but not limited to a particular assay to be run and a detection method to be performed.

In some embodiments of the present invention system 100 comprises a heating system 124. Heating system 124 can be of any type. The heating system can be configured to heat the cartridge by conduction, radiation and/or convection. In some embodiments of the present invention the heating system heats the cartridge device by conduction. Alternatively, the heating system heats the cartridge device by radiation or convection but without conduction. Preferably, system 100 also comprises a temperature sensor 126. For example, temperature sensor 126, can be mounted on or be adjacent to the heating platform of heating system 124 which contacts device 101 once loaded to system 100.

In use, cartridge device 101, with wells filled with reagents and other substances for performing the assay, with sterile disposable tips placed within a dedicated compartment, and with a container containing a sample to be analyzed, is introduced by the operator to holder 102. The robotic arm picks up one of tips from the dedicated compartment by way of driving the robotic arm into one of the tips in the dedicated compartment. Information stored on device 101 is read by reader 136. Controller 112 establishes a relative motion between device 101 and pipette 110 such that pipette 110 such that pipette 110 aspirates into tip 111 the liquid to be analyzed and other reagents and substances for the assay. Controller 112 moves tip 111 of pipette 110 into chamber 106 for analysis by internal analyzer system 104, which optionally and preferably uses processor 113 for the analysis. For example, processor 113 can receive signals from the optical detector of system 104 and determine the amount of the target substance in the liquid (e.g., body liquid) based on the intensity of the signals. Data processor 113 can receive from sensor 126 data corelative to the temperature of the reagent in device 101, and also receive data pertaining to the type of reagents in device 101 from reader 136. Data processor 113 can then correct the measured amount of the analyte in the sample based on the received data and on the type of reagent.

Once the analysis is completed, controller 112 establishes a relative motion between device 101 and pipette 110 until tip 111 of pipette 110 enters the dedicated compartment of device 101. Controller 112 releases tip 111 of pipette 110 into the dedicated compartment.

Optionally and preferably, controller 112 causes robotic arm 108 to pick up another new pipette tip from the dedicated compartment and performs another assay by repeating the above operations protocol with another set of wells of the same cartridge device 101. Processor 113 can instruct the display 114 to display the results obtained from one or more of the performed assays.

In embodiments in which the signal that is indicative of the amount of the analyte in the sample is an optical signal detected by a PMT, the PMT is preferably activated only after the pipette tip is fatedly introduced into the dark chamber such as to seal the dark chamber from ambient light. This is because the PMT is designed to operate at low light conditions, and so activating the PMT before the dark chamber is sealed may lead to deterioration in the performance (e.g. increased dark current with hours scale of recovery time), and even permanent damage. For the same reason, the PMT is deactivated before retreating the pipette tip off the dark chamber.

It was found by the Inventors, that convectional PMT remain biased for a prolonged period of time (tens of seconds) after they have been deactivated. The reason for this behavior is that the PMT employs a capacitor between its anode and cathode in order to maintain the necessary amplification voltage (about 1-2 kV) of the PMT. However, for a prolong time after a deactivation of the PMT, the capacitor remains charged, keeping the PMT biased. Such a behavior is disadvantageous because it requires the system to maintain the tip in the dark chamber after the measurement has been completed until the PMT is no longer biased.

Figure 3:
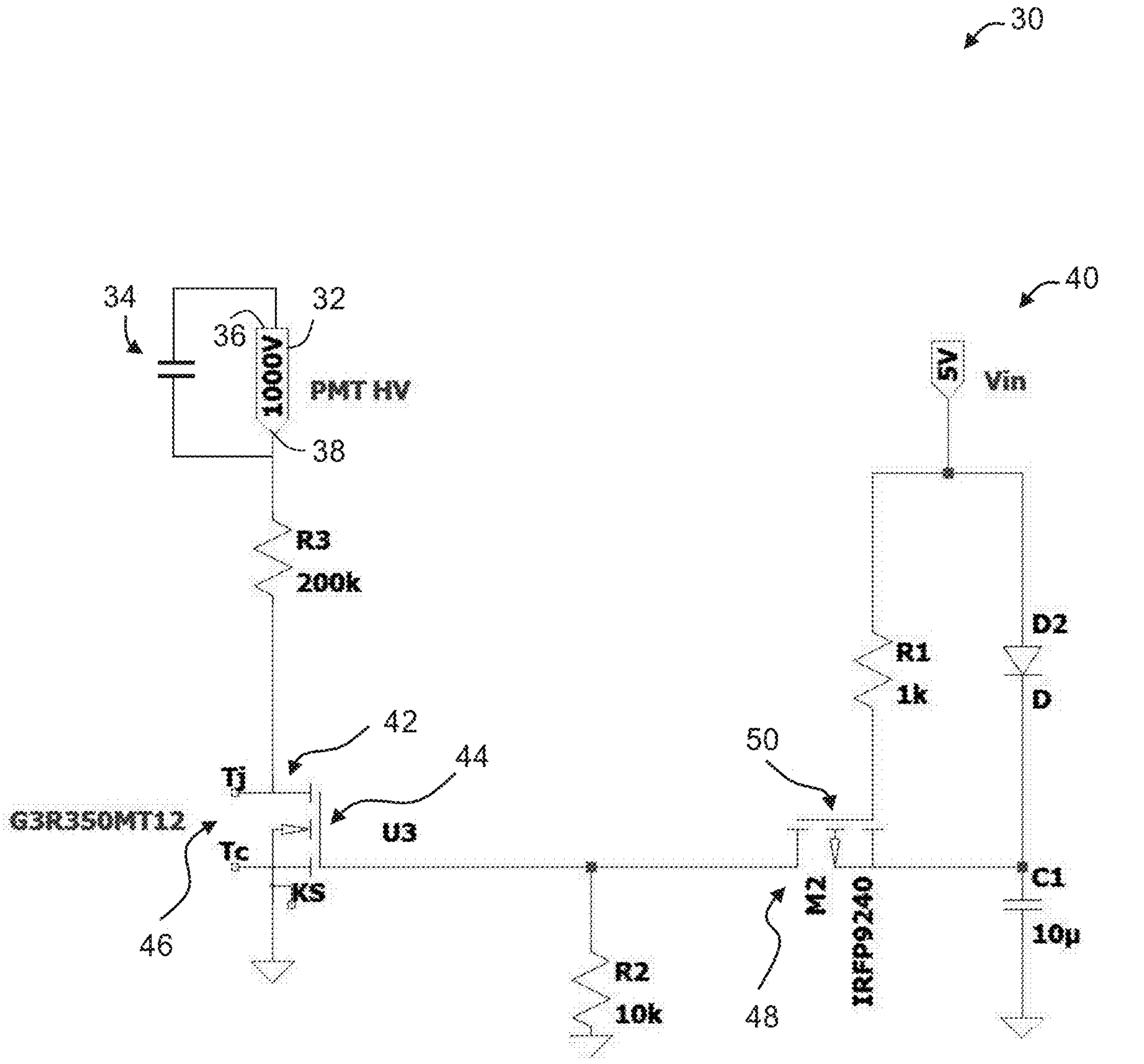
FIG. 3 is a schematic illustration of control circuitry for a PMT, according to some embodiments of the present invention.

The Inventors devised a solution to this problem by providing control circuitry for a PMT. FIG. 3 is a schematic illustration of control circuitry 30 for a PMT 32. Control circuitry 30 can be implemented in system 100 in embodiments in which the internal analyzer system 104 comprises a PMT.

Circuitry 30 comprises a capacitor 34 for maintaining amplification voltage between the anode 36 and the cathode 38 of PMT 32. Capacitor 34 is connectable to an external power source (not shown). Circuitry 30 also comprises a switching circuit 42 having a gate 44 connected to a voltage feeding circuit 40, and a discharging channel 46 connected to capacitor 34.

Switching circuit 42 is preferably a transistor, such as, but not limited to, a MOSFET, more preferably a silicon carbide MOSFET. Transistor 42 is illustrated as an n-channel MOSFET but can also be a p-channel MOSFET. Transistor 42 is optionally and preferably able to withhold voltage of at least 1 kV more preferably at least 2 kV, sufficiently low leakage current ($I_{DSS}$), so that it does not load the PMT 32. The transistor 42 is optionally and preferably turned on upon arrival of a pulse of from about 4V to about 5V to its gate 44. Representative examples of types of silicon carbide MOSFET suitable for the present embodiments including, without limitation, IXYS-IXTA3N150HT, LSIC1MO170E1000, ROHM-SCT2H12NY, Infineon-IPW90R120C3, ST-STW21N150K5, CREE-C2M0045170P, UnitedSic. In experiments performed by the inventors, Genesic-G3R350MT12J was tested. The leakage current was measured to be less than 0.1 μA at PMT voltage of about 1 kV.

Voltage feeding circuit 40 is designed and configured such that when the external power source is turned off, feeding circuit 40 momentarily activates gate 44 such that capacitor 34 is discharged via discharging channel 46. The discharging of capacitor 34 is preferably characterized by a time constant of less than 200 ms, more preferably less than 100 ms, more preferably less than 50 ms, less than 30 ms. Circuitry 30 is therefore advantageous since it provides a fast discharge of the capacitor 34 and so the PMT becomes unbiased a short time after it is powered off, allowing the system to retreat the pipette tip off the dark chamber shortly after the measurement.

Circuitry 30 can also comprise a resistor R3 which, together with the capacitor 34 provides the time constant for the discharge. In experiments performed by the inventors, a capacitor 34 of about 14 nF, and a 200 kΩ resistor R3 were used. The time scale for complete discharge was about 3 RC<10 ms. The resistor R3 is optionally and preferably sufficiently large in case of a failure (shorted) of the transistor 42. A 200 kΩ can create a maximum of 5 mA current and power dissipation of 5 W. The resistor can be rated accordingly.

In a representative implementation voltage feeding circuit 40 comprises an additional capacitor C1, connected such that when the external power source is turned on, additional capacitor C1 is charged, and when the external power source is turned off additional capacitor C1 is discharged, causing the momentary activation of gate 44. Typically, additional capacitor C1 is discharged via a channel of an additional transistor 48, that serves as a pulse generator for switching transistor 42 to its on state. Alternatively, a relay can be used as the pulse generator.

The external power source is preferably connected to the gate 50 of additional transistor 48. In some embodiments of the present invention additional transistor 48 is a p-channel MOSFET, but other types of pulse generators are also contemplated. As a representative example, when the external power source supplies voltage of $V_{in}$ (say, 5 V) both the gate and the source voltages of transistor 48 also equal $V_{in}$, and so transistor 48 also is in cut-off mode and is not conducting. When the external power source is disconnected, the gate voltage of transistor 48 drops to 0 instantaneously, while the source voltage of transistor 48 drops remains at $V_{in}$, since capacitor C1 is still charged. The transistor 48 is thus turned on and C1 is discharged, for example, through another resistor R2. This creates a positive voltage on R2 hence also on the gate 44 of transistor 42, thus discharging the capacitor 34.

The duration of the pulse that is applied to gate 44 is determined by the time scale R2·C1. It is optionally and preferably sufficiently long to keep the transistor 42 conducting for the entire discharge time of the PMT. The value of R2 is optionally and preferably selected sufficiently small so as to prevent gating of transistor 42 by leakage current through transistor 48.

In some embodiments of the present invention capacitor C1 of circuit 40 is charged through a diode D2. The forward voltage on the diode D2 is optionally and preferably as small as possible for the charging to be as close as possible to the power supply (5V, in the present example). The advantage of diode D2 is that it prevents C1 from discharging back through the power supply. Alternatively, or additionally, capacitor C1 of circuit 40 is charged through a resistor of sufficiently high resistance. This resistor is optionally and preferably larger than R2 (e.g., at least 5 times or 10 times larger) so the discharge of C1 is determined by R2 and not by this resistor. In some embodiments of the present invention the charging time is less than a predetermined value, which can depend on the application.

It is appreciated that while FIG. 3 illustrates an embodiment in which a positive voltage is applied to the anode 32, the skilled person, provided by the details presented herein, would be able to modify the circuit to the case in which a negative voltage is applied to the cathode 38.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Thermally Biased Biological Assay

Figure 4:
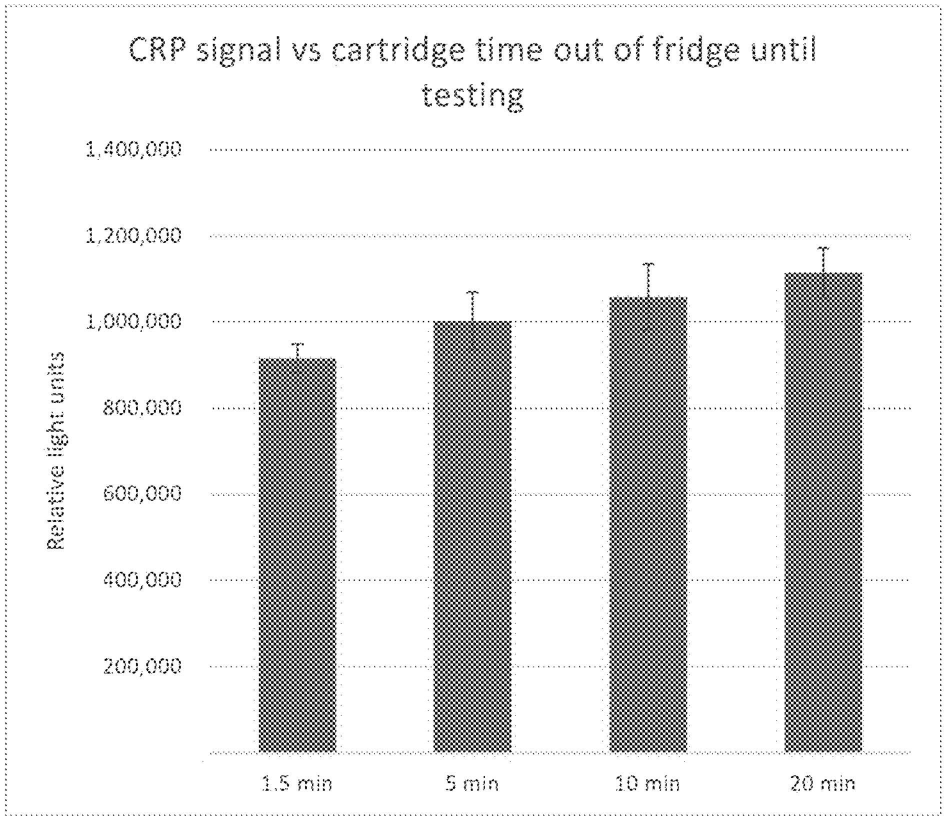
FIG. 4 shows an example of a thermal bias of biological assay, obtained in experiments performed according to some embodiments of the present invention.

FIG. 4 shows an example of a thermal bias of biological assay. The biological assay was conducted using MeMed Key® analyzer, marketed by MeMed, Israel. Cartridges containing the reagents were kept at controlled temperature of 2-8° C. The assays were conducted 1.5 min, 5 min, 10 min and 20 min after the cartridges were taken out of the controlled temperature. As shown, longer delays of the assay (corresponding to higher cartridge temperature) result in higher relative light unit outputs, which are converted to a higher assessed concentration.

Figure 5:
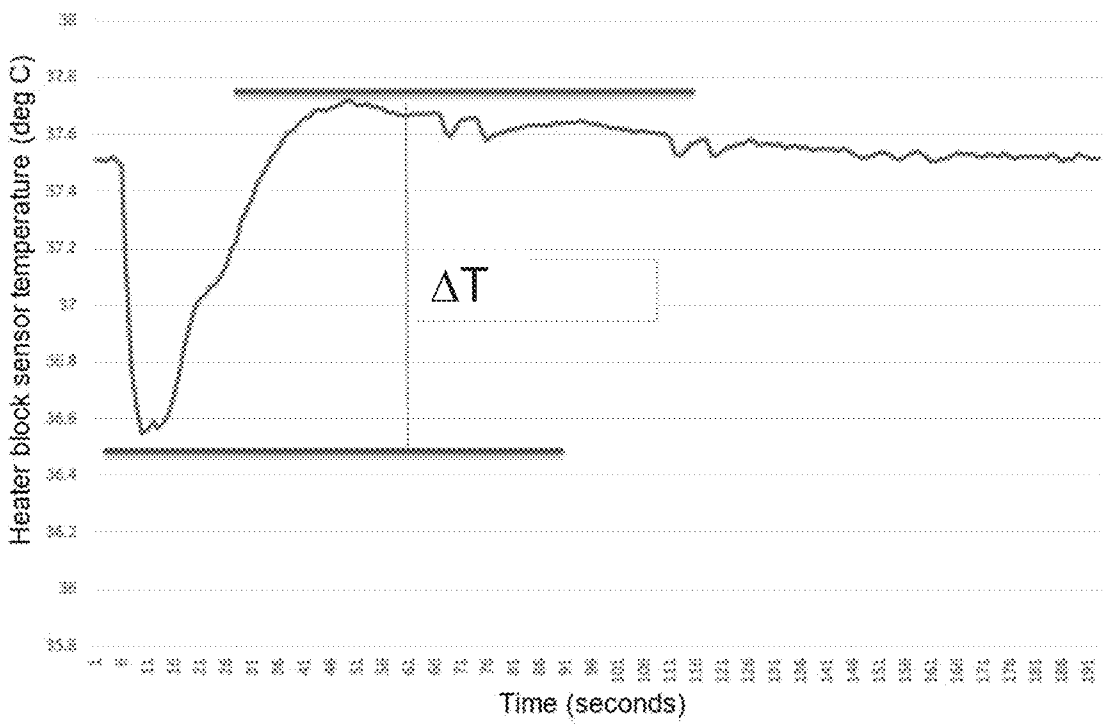
FIG. 5 shows measured output of a temperature sensor of a heater block, as a function of time since cartridge loading, in seconds, as obtained in experiments performed according to some embodiments of the present invention.

FIG. 5 shows the measured output of the temperature sensor 126 of the heater block 124 (see FIG. 2), as a function of time since cartridge loading, in seconds. Since the cartridge contacts the heater block 124 there is a change upon loading of the cartridge to the system. The difference ΔT between the maximal measured temperature and the minimal measured temperature (represented as solid lines) was calculated and used for constructing the correction function.

Figure 6:
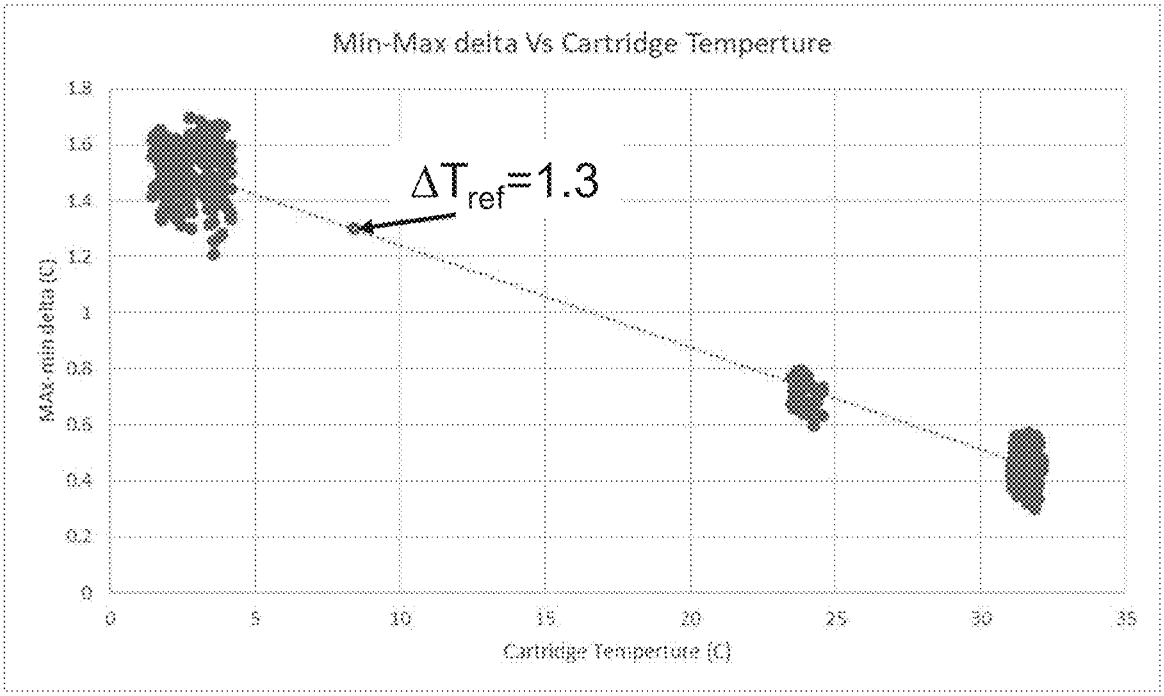
FIG. 6 shows a correlation obtained between change in a heater block temperature sensor and a cartridge temperature, as obtained in experiments performed according to some embodiments of the present invention.

FIG. 6 shows a correlation obtained between the change in the heater block temperature sensor and the cartridge temperature. A linear correlation is observed. The data demonstrates a correlation relation between ΔT and the cartridge temperature. The reference temperature difference $\Delta T_{ref}$ was selected to be the value of ΔT when the cartridge's temperature was about 8° C. As shown the obtained value of $\Delta T_{ref}$ was about 1.3° C.

Figure 7:
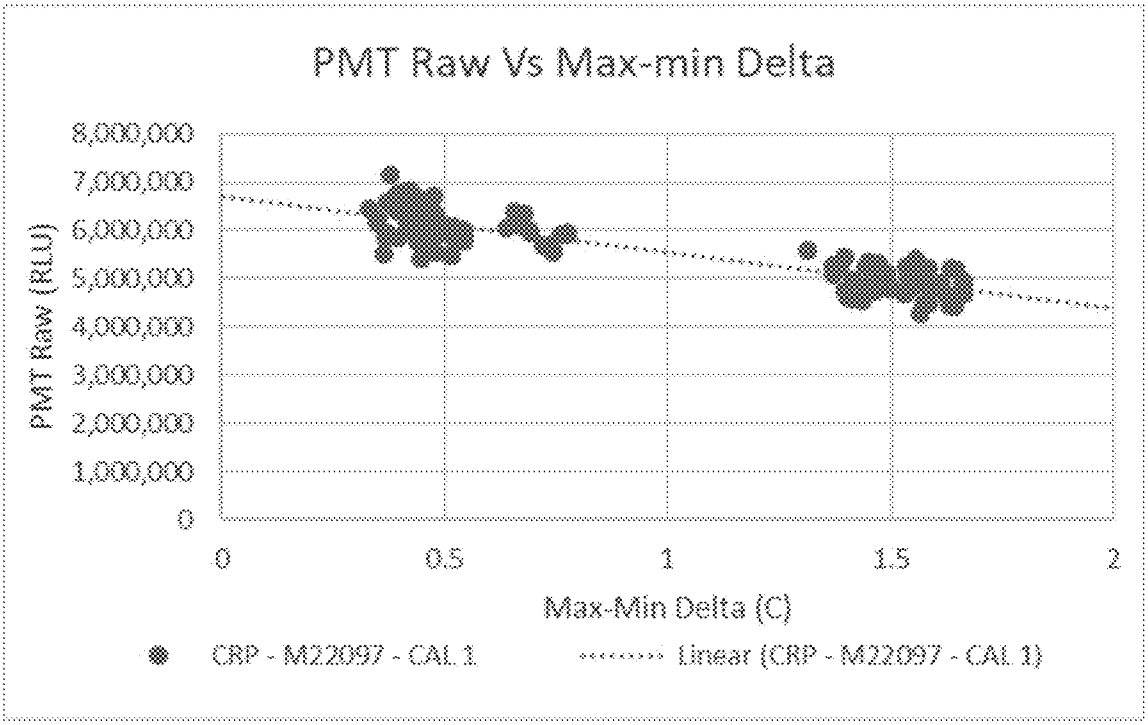
FIG. 7 shows relation between output of a PMT in Relative Light Units (RLU) and a temperature difference read by a temperature sensor, as obtained in experiments performed according to some embodiments of the present invention.

FIG. 7 shows relation between output of the PMT in Relative Light Units (RLU) and ΔT (see FIG. 5). The dots represent RLU measured for CRP with a specific cartridge lot and a specific sample. That is to say, the dots represent CRP RLUs measured with the same type of samples and the same cartridge lot, and therefore the differences in RLUs are a result of the cartridge temperature change.

Figure 8:
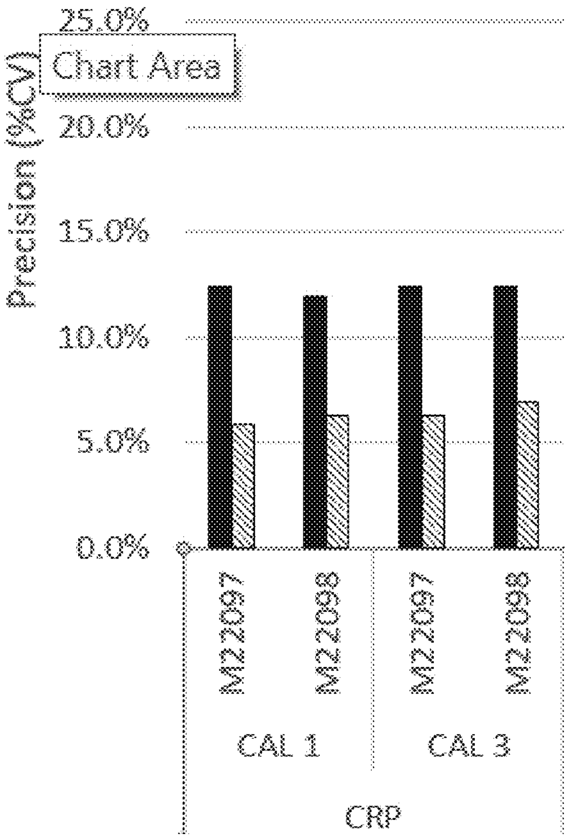
FIG. 8 shows results of about 140 measurements of CRP output signal with two types of samples, obtained in experiments performed according to some embodiments of the present invention.

FIG. 8 shows the results of about 140 measurements of CRP output signal with two types of samples (named CAL1 and CAL3). Solid bar represents the precision obtained across two different cartridge lots when a correction for cartridge temperature is not employed. Hatched bar represents the precision obtained across two different cartridge lots when a correction for cartridge temperature was employed. A significant reduction (of roughly 50%) in the assay precision was obtained.

Table 1, below lists representative examples for values of the scaling factor parameter R, for assays performed serially using the cartridges. The first row of Table 1 corresponds to a quality control assay performed using an IP-10 substrate immediately after loading the cartridge, the second row of Table 1 corresponds to a quality control assay performed using a TRAIL substrate after completing the assay of the first row, the third row of Table 1 corresponds to an assay performed after completing the assay of the second row using a TRAIL substrate once conjugated to detect TRAIL levels, the fourth row of Table 1 corresponds to an assay performed after completing the assay of the third row using a CRP substrate once conjugated to detect CRP levels. The fifth row of Table 1 corresponds to an internal control assay performed using a TRAIL substrate.

TABLE 1

| Item Description | Value | Comments |
|---|---|---|
| IP-10 Substrate QC Cartridge Temperature Scaling Factor | −71.5% | Scaling factor for IP-10 Substrate QC Cartridge temperature compensation |
| TRAIL Substrate QC Cartridge Temperature Scaling Factor | −52.0% | Scaling factor for TRAIL substrate QC cartridge temperature compensation |
| TRAIL Cartridge Temperature Scaling Factor | −7.7% | Scaling factor for TRAIL cartridge temperature compensation |
| CRP Cartridge Temperature Scaling Factor | −22.3% | Scaling factor for CRP cartridge temperature compensation |
| Post TRAIL IC Cartridge Temperature Scaling Factor | 0 | Scaling factor for Post TRAIL IC cartridge temperature compensation. Default Value, not in use. |

Example 2

Fast Discharge of a Photomultiplier Tube

Figure 9:
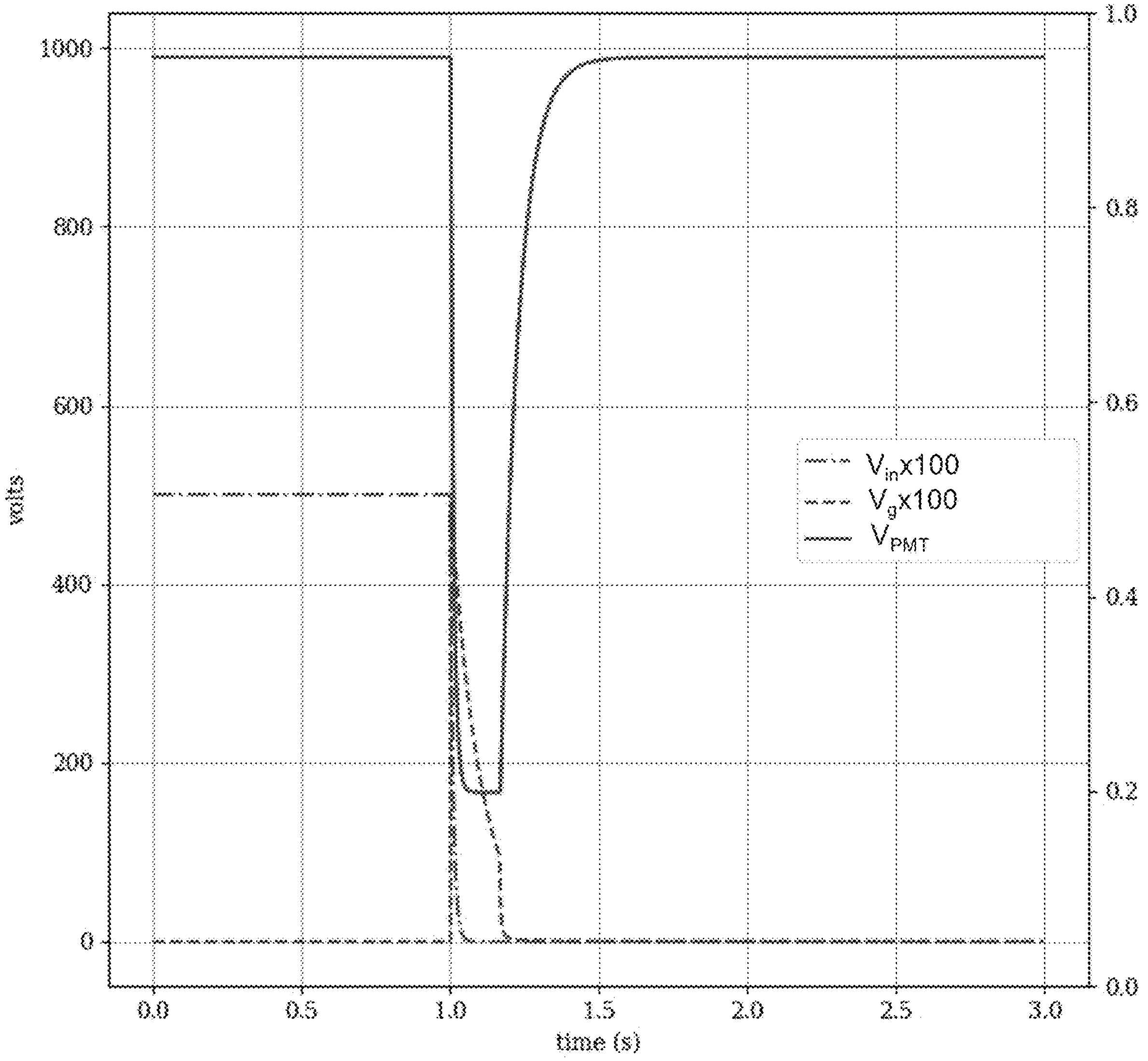
FIG. 9 shows computer simulations of a time dependence of a PMT voltage provided using the circuitry of FIG. 3.

Computer simulations of the time dependence of the PMT voltage provided using the circuitry 30 of FIG. 3, are shown in FIG. 9. Shown are three waveforms representing the input Vin, the voltage at gate 44, and the voltage on PMT 32. The solid waveform starting from 1 kV in time t=0 s is the voltage on PMT 32. The dash-dot waveform starting from 5V at time t=0 s is the input voltage Vin (multiplied by 100). The dashed waveform starting from V=0V is the voltage at gate 44 (multiplied by 100).

At time t=1 s the dash-dot waveform goes from 5V to 0V resembling the input low voltage turn-off time. At the same time, the dashed waveform goes from 0V to 5V switching the transistor 46. At the same time, the solid waveform goes from 1 kV to about 150V on behalf of discharging the capacitor 34.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of conducting a biological assay, comprising obtaining data corelative to a temperature of a reagent selected to emit an optical signal, mixing said reagent with a sample to provide a mixture, receiving from said mixture said signal, said signal being indicative of an amount of an analyte in said sample, and correcting said amount based on said obtained data and on a type of said reagent;

wherein said reagent is contained in a cartridge loadable into a system;

wherein said obtained data comprise a temperature change induced by said cartridge on said system; and wherein said obtaining of said data is prior to said mixing of said reagent with said sample.

2. The method of claim 1, comprising measuring a temperature of said reagent, thereby providing said data.

3. The method of claim 1, wherein said reagent is contained in a cartridge, and the method comprises measuring a temperature of said cartridge, thereby providing said data.

4. The method of claim 1, wherein said cartridge is in thermal communication with a heating system having a temperature sensor, and wherein said measuring said thermal changes comprises measuring changes in a signal generated by said sensor.

5. The method of claim 1, wherein said signal is a digital signal $S_m$, and wherein said correcting comprises applying to said digital signal a correction function specific to said reagent, to provide a corrected signal $S_c$.

* * * * *